UNITED STATES PATENT OFFICE.

HARVEY M. BURKEY, OF PLAINFIELD, NEW JERSEY, AND HENRY M. SCHLEICHER, OF BOSTON, MASSACHUSETTS, ASSIGNORS TO AMERICAN METAL COMPANY, LTD., OF NEW YORK, N. Y., A CORPORATION OF NEW YORK.

DECOMPOSITION OF ALUMINUM SULPHATE, ETC.

1,415,308.   Specification of Letters Patent.   Patented May 9, 1922.

No Drawing.   Application filed February 16, 1920.   Serial No. 359,044.

*To all whom it may concern:*

Be it known that we, HARVEY M. BURKEY and H. M. SCHLEICHER, of Plainfield, New Jersey, and Boston, Massachusetts, respectively, have invented certain new and useful Improvements in Decomposition of Aluminum Sulphate, etc.; and we do hereby declare the following to be a full, clear, and exact description of the invention, such as will enable others skilled in the art to which it appertains to make and use the same.

This invention relates to the decomposition of aluminum sulphate, alum, or mixtures of aluminum and other sulphates, in solution, by heating such solutions to a high temperature and pressure, with resulting production of sulfuric acid and of insoluble basic aluminum compounds.

It is known that neutral solutions of aluminum sulphate hydrolyze to some extent, but the hydrolysis is repressed by the sulfuric acid formed and reaches an equilibrium when the formation of a certain amount of sulfuric acid has taken place. This hydrolysis is greatly repressed if other sulphates are present in the solution, particularly those that form alums with the aluminum sulphate. The hydrolysis will continue if a substance is introduced which combines with the sulfuric acid, but the sulfuric acid will, in such case, be lost in the form of the compound formed, and, if such compound is insoluble, it will contaminate the alumina or basic aluminum compounds precipitated.

We have found, however, that if a solution of aluminum sulphate, or a solution of aluminum sulphate containing another sulphate such as potassium sulphate, which solution will not hydrolyze, or which will hydrolyze only to a limited extent, under ordinary conditions, is heated in an autoclave to pressures greater than atmospheric, decomposition takes place and insoluble basic compounds and sulfuric acid are formed. The free sulfuric acid can thus be obtained as one of the products of the reaction and made use of, for example, in the production of further amounts of the sulphate solution to be subjected to decomposition. The amount of aluminum precipitated in the form of basic compounds, e. g. as the basic sulphate $Al_2(OH)_4(SO_4)$, will vary, depending in part upon the amount of other sulphate, such as potassium sulphate, present. In general, the higher the temperature and pressure, the more complete is the decomposition reaction. The potassium sulphate, when present, is not decomposed, and remains in solution with the sulfuric acid, (except for such amounts as may be precipitated with the aluminum), and it can thus be separated from the precipitated aluminum.

Whereas, for example, a solution containing two parts, molecularly, of potassium sulphate $(K_2SO_4)$ to one of aluminum sulphate $(Al_2(SO_4)_3)$ gives no precipitate of alumina at ordinary pressure, even when heated to boiling, we have found that decomposition and precipitation will readily take place if the solution is heated in a closed vessel to high temperature and pressure.

The extent to which the aluminum can be thus precipitated is illustrated from the following percentages, obtained by heating a solution (nearly saturated at 100° C.) containing alum (potassium sulphate and aluminum sulphate) and one more mol equivalent of potassium sulphate (i. e. two mols of potassium sulphate to one of aluminum sulphate) in an autoclave, for one hour to the pressures (and corresponding temperatures) indicated.

| Pressure in lbs. per sq. in. | % of $Al_2O_3$ precipitated. |
|---|---|
| 100 | 82.7 |
| 150 | 87.3 |
| 200 | 92.3 |
| 250 | 94.3 |
| 275 | 95.4 |
| 300 | 97.8 |

With a solution of alum alone (potassium-aluminum sulphate) containing a ratio of potassium sulphate to aluminum sulphate of 1 to 1, about 60% of the aluminum has been precipitated at 100 lbs. pressure (and corresponding temperature) and about 74% at 200 lbs. pressure. The presence of extra water, however, is not necessary, and the amount of aluminum precipitated can be materially increased if the alum is not dissolved, but is heated directly in the autoclave, so that it first melts and dissolves in its water of crystallization and then decomposes. About 82% of the aluminum can be thus precipitated at 200 lbs. pressure in one hour's treatment, and about 84% in two hours' treatment.

When the decomposition takes place in the presence of potassium sulphate, a portion of the potash is precipitated with the alumina, and where the solution contained two mols of potassium sulphate to one of aluminum sulphate, precipitates of practically constant composition have been obtained. The greater portion of the potassium sulphate, however, remains in solution in admixture with the sulphuric acid formed, and can be separated from the insoluble aluminum compounds that are produced by the decomposition. The process of the present invention, accordingly, enables potassium and aluminum to be separated from each other when they occur together in solution, or in the form of alum, etc.

From the acid liquor, after separation of the precipitated alumina, the potassium sulphate can be in part separated by crystallization, preceded by concentration if necessary.

The acid liquor, containing the sulphuric acid produced by the decomposition, and which may also contain potassium sulphate, and the undecomposed aluminum sulphate, may be advantageously employed for the production of further amounts of alum or of sulphate solution to be decomposed, by treating suitable material containing alumina and potash therewith, at a temperature appropriate to the conversion of the alumina and potash to sulphates. By repeated use of the acid liquor resulting from the decomposition, in the treatment of such aluminum and potassium-containing material, the potash content of the liquor can be increased to such an extent that the recovery of potash therefrom by crystallization or otherwise is materially facilitated.

The process of the present invention is of more or less general application, for example, to the decomposition of alums or solutions of alum-stone, etc., and enables the potassium and aluminum to be separated from silica and other impurities insoluble in the acid liquor, and the potassium aluminum to be subsequently separated from each other.

The potassium-aluminum sulphate may, as above noted, be obtained by extraction of suitable alum-containing material with a suitable solvent, or by heating the material, e. g. slate, with sulphuric acid and leaching the sulphates of alumina and potash from the sulfated material; and the acid liquor resulting from the decomposition of such solutions, or of the alum crystallized therefrom, may be used in the further sulfating of the slate or other material, or in the extraction of such material.

Solutions of iron (ferric) sulphate, or of iron alum (potassium-iron sulphate) can be subjected to decomposition in a manner similar to that above described, and sulfuric acid, or a mixture of acid and potassium sulphate, and of precipitated iron compounds obtained therefrom.

Ferrous sulphate, however, is not readily decomposed, and, when iron sulphate is present in the aluminum sulphate or alum solutions, a separation of iron from the aluminum can be effected by reducing the iron sulphate to the ferrous state prior to the decomposition.

We claim:

1. The method of effecting the decomposition of aluminum sulphate, which comprises heating a solution of the same to a high temperature and pressure.

2. The method of effecting the decomposition of aluminum sulphate, which comprises heating a solution of the same which also contains a non-decomposable sulphate, to a high temperature and pressure.

3. The method of effecting the decomposition of aluminum sulphate, which comprises heating a solution of aluminum and potassium sulphates to a high temperature and pressure.

4. The method of effecting the decomposition of aluminum sulphate, which comprises heating crystalline potash alum to melt the same and produce a solution, and heating the resulting solution to a temperature and pressure sufficient to effect the decomposition.

5. The method of making basic aluminum sulphate comprising heating a solution of aluminum sulphate to a high temperature and pressure to decompose it and to precipitate the aluminum as the basic sulphate, the decomposition resulting in the formation of sulfuric acid, and using the sulfuric acid so formed in producing more aluminum sulphate.

6. The method of making basic aluminum sulphate comprising heating a solution of potassium alum to a high temperature and pressure so as to decompose it and precipitate the aluminum as the basic sulphate, and to form sulfuric acid, the potassium remaining in solution in the mother liquor with the sulfuric acid, and using this mother liquor in the production of more potassium alum.

In testimony whereof we affix our signatures.

H. M. BURKEY.
HENRY M. SCHLEICHER.